United States Patent [19]
Kawamura et al.

[11] Patent Number: 5,891,961
[45] Date of Patent: Apr. 6, 1999

[54] COATING COMPOSITION AND COATING METHOD

[75] Inventors: Chikara Kawamura, Hiratsuka; Satoru Ito, Kanagawa-ken, both of Japan

[73] Assignee: Kansai Paint Co., Ltd, Amagasaki, Japan

[21] Appl. No.: 850,386

[22] Filed: May 2, 1997

[30] Foreign Application Priority Data

May 7, 1996 [JP] Japan .................................. 8-112324

[51] Int. Cl.⁶ .................................................. C08F 26/06
[52] U.S. Cl. ........................ 525/169; 525/326.8; 525/259
[58] Field of Search ............................... 525/326.8, 259, 525/169

[56] References Cited

U.S. PATENT DOCUMENTS

| | | | |
|---|---|---|---|
| 4,528,311 | 7/1985 | Beard | 524/91 |
| 4,845,180 | 7/1989 | Henry | 528/73 |
| 5,629,365 | 5/1997 | Razavi | 524/37 |
| 5,712,324 | 1/1998 | Lilly | 522/75 |

*Primary Examiner*—Paul R. Michl
*Attorney, Agent, or Firm*—Armstrong, Westerman, Hattori, McLeland & Naughton

[57] ABSTRACT

The invention provides a coating composition comprising (A) a vinyl resin having a structure of 2-(2'-hydroxyphenyl)-benzotriazole in the resin skeleton and (B) a crosslinking agent, and a coating method using the coating composition.

The coating composition of the invention is capable of forming coating films which are improved in acid resistance, weatherability and other properties without impairment of finished appearance and processability.

9 Claims, No Drawings

COATING COMPOSITION AND COATING METHOD

The present invention relates to a novel coating composition and a coating method.

It is desired that a coating film on a plastics substrate as on automotive exterior plastics panels be superior in important properties, namely in finished appearance such as surface smoothness, gloss and distinctness-of-image gloss and in processability such as flexibility.

Top coat compositions heretofore predominantly used for plastics substrates are those containing, as main components, a hydroxyl-containing acrylic resin or a hydroxyl-containing polyester resin and an amino resin. These coating compositions give a coating film excellent in finished appearance and processability and are widely used.

However, in recent years, the environment has been attacked by air pollution, and acid rain has inflicted damages such as withering woods, posing a serious social problem. Another problem is that automotive exterior panels coated with said top coat composition have been etched by acid rain or the like, whereby the top coat has suffered blushing or staining. Consequently there exists a great need for development of highly acid-resistant coating films.

On the other hand, while top coat compositions for automotive outer panels generally contain a ultraviolet absorber, ultraviolet stabilizer and the like to improve the weatherability, these components may dissolve out on exposure to, e.g. rain water or car washing water, leading partly to yellowing and cracking of coating films due to ultraviolet rays. Accordingly, there is also a need for top coating films which are satisfactory in weatherability even if a ultraviolet absorber and ultraviolet stabilizer are absent.

An object of the present invention is to provide a novel coating composition suitable as a top coat composition for a plastics substrate, said composition having high storage stability and being capable of forming a coating film with outstanding finished appearance and processability and also with superior weatherability, acid resistance, stain resistance and scratch resistance.

According to the present invention, there are provided a coating composition (I) comprising (A) a vinyl resin having a structure of 2-(2'-hydroxyphenyl)-benzotriazole in the resin skeleton and (B) a crosslinking agent, and a method of forming a coating film using the coating composition.

The present inventors carried out extensive research to develop a coating composition capable of giving a coating film significantly improved, e.g. in acid resistance and weatherability without impairment of finished appearance, processability and the like and found that a coating composition comprising a vinyl resin having a 2-(2'-hydroxyphenyl)-benzotriazole structure is capable of forming a coating film improved, e.g. in acid resistance and weatherability without degradation of finished appearance and processability. The present invention was completed based on this novel finding.

The vinyl resin (A) is a vinyl resin having a 2-(2'-hydroxyphenyl)-benzotriazole structure in its skeleton.

The 2-(2'-hydroxyphenyl)-benzotriazole structure (hereinafter called "HPB-triazole structure") is represented by the formula (1)

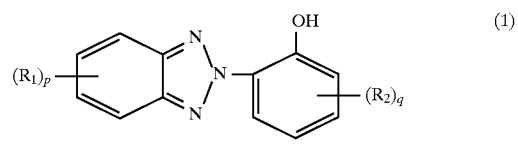

wherein $R_1$ and $R_2$ are the same or different and each represents a halogen atom, an alkyl group having 1 to 18 carbon atoms, an alkoxy group having 1 to 8 carbon atoms, a cyclic alkyl group having 5 to 8 carbon atoms or an aryl group, and p and q are each 0, 1, 2 or 3.

The halogen atom in the formula (1) is, for example, chlorine, bromine or the like. The alkyl group having 1 to 18 carbon atoms is, for example, methyl, ethyl, propyl, n-butyl, t-butyl, sec-butyl, amyl, octyl, lauryl, stearyl or the like. The alkoxy group having 1 to 8 carbon atoms is, for example, methoxy, ethoxy, propoxy, butoxy, hexyloxy or the like. The cyclic alkyl group having 5 to 8 carbon atoms is, for example, cyclopentyl, cyclohexyl or the like. The aryl group is, for example, phenyl, naphthyl or a group which is substituted on the ring of these groups with alkyl of 1 to 18 carbon atoms.

The vinyl resin (A) can be prepared by polymerization of a polymerizable vinyl monomer having a HPB-triazole structure as the essential component and as an optional component at least one member selected from the group consisting of hydroxyl-containing polymerizable vinyl monomers, carboxyl-containing polymerizable vinyl monomers and other polymerizable vinyl monomers.

The polymerizable vinyl monomer having a HPB-triazole structure is a monomer having one polymerizable double bond per molecule and at least one HPB-triazole structure per molecule.

Specific examples of the polymerizable monomer having a HPB-triazole structure are 2-(2'-hydroxy-5'-(meth)acryloxyethylphenyl)-2H-benzotriazole, 2-(2'-hydroxy-5'-(meth)acryloxyethylphenyl)-5-chloro-2H-benzotriazole, 2-(2'-hydroxy-3'-(meth)acryloxyethyl-5'-methylphenyl)-2H-benzotriazole, 2-(2'-hydroxy-3'-(meth)acryloxyethyl-5'-methylphenyl)-5-chloro-2H-benzotriazole, 2-(5'-t-butyl-2'-hydroxy-3'-(meth)acryloxyethylphenyl)-2H-benzotriazole, 2-(5'-t-butyl-2'-hydroxy-3'-(meth)acryloxyphenyl)-5-chloro-2H-benzotriazole, 2-(5'-t-amyl-2'-hydroxy-3'-(meth)acryloxy-ethylphenyl)-2H-benzotriazole, 2-(5'-t-amyl-2'-hydroxy-3'-(meth)acryloxyethylphenyl)-5-chloro-2H-benzotriazole, 2-(2-hdroxy-3'-(meth)acryloxyethyl)-5'-t-octylphenyl)-2H-benzotriazole, 2-(2'-hydroxy-3'-(meth)acryloxyethyl-5'-t-octylphenyl)-5-chloro-2H-benzotriazole, etc.

Hydroxyl-containing polymerizable vinyl monomers to be used are monomers containing one polymerizable double bond per molecule and at least one hydroxyl group per molecule such as a monoester of dihydric alcohol with (meth)acrylic acid, ε-caprolactone-modified vinyl monomer, etc.

Examples of the monoester of dihydric alcohol with (meth)acrylic acid are 2-hydroxyethyl (meth)acrylate, hydroxypropyl (meth)acrylate, 2,3-dihydroxypropyl (meth)acrylate, 1,4-butanediol monoacrylate, (poly)ethylene glycol mono(meth)acrylate, etc.

The ε-caprolactone-modified vinyl monomer includes, for example, a monomer represented by the formula (2)

wherein R is a hydrogen atom or a methyl group and n represents an average polymerization degree, which is 0.5 to 5. Specific examples of commercially available products are "PLACCEL FA-1", "PLACCEL FA-2", "PLACCEL FA-3", "PLACCEL FA-4", "PLACCEL FA-5", "PLACCEL FM-1", "PLACCEL FM-2", "PLACCEL FM-3", "PLACCEL FM-4" and "PLACCEL FM-5" (trade names, products of Daicel Chemical Industries, Ltd., esters of 2-hydroxyethyl acrylate) to which, however, the monomer is not limited.

The foregoing hydroxyl-containing polymerizable vinyl monomers can be used either alone or in combination. Among the above examples, 1,4-butanediol monoacrylate is favorable for improving scratch resistance and ε-caprolactone-modified (meth)acrylate for enhancing processability.

Carboxyl-containing polymerizable vinyl monomers for use herein are monomers having one polymerizable double bond per molecule and at least one carboxyl group per molecule such as (meth)acrylic acid, maleic acid, maleic anhydride, etc.

The other polymerizable vinyl monomers are monomers having one polymerizable double bond per molecule and free of a functional group reactive with the crosslinking agent (B). Specific examples are methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, n-octyl (meth)acrylate, lauryl (meth)acrylate, tridecyl (meth)acrylate, stearyl (meth)acrylate and like monoesters of monohydric alcohol of 1 to 24 carbon atoms with (meth)acrylic acid; acrylonitrile, acrylamide, vinyl chloride and vinyl acetate; etc.

While the proportions of these vinyl monomers in the vinyl resin (A) can be selected as desired according to the purpose, the proportion of the polymerizable vinyl monomer having a HPB-triazole structure is 0.1 to 100% by weight, preferably 0.1 to 15% by weight, the proportion of the hydroxyl-containing polymerizable vinyl monomer is 0 to 80% by weight, preferably 5 to 50% by weight, the proportion of the carboxyl-containing polymerizable vinyl monomer is 0 to 10% by weight, preferably 0.1 to 5% by weight and the proportion of the other polymerizable vinyl monomer is 0 to 99% by weight, preferably 30 to 94.8% by weight, all based on the total weight of the vinyl monomers composing the vinyl resin (A).

The foregoing vinyl monomers can be (co)polymerized by conventional processes of preparing an acrylic resin or vinyl resin, for example, by dissolving or dispersing the above components in an organic solvent and heating the solution or the dispersion with stirring at a temperature of about 60 to about 180° C. in the presence of a radical polymerization initiator. The reaction time is usually about 1 to about 10 hours.

Examples of organic solvents useful in the polymerization are hydrocarbon solvents such as heptane, toluene, xylene, octane and mineral spirit, ester solvents such as ethyl acetate, n-butyl acetate, isobutyl acetate, methyl cellosolve acetate and butyl carbitol acetate, ketone solvents such as methyl ethyl ketone, methyl isobutyl ketone and diisobutyl ketone, alcohol solvents such as methanol, ethanol, isopropanol, n-butanol, sec-butanol and isobutanol, ether solvents such as n-butyl ether, dioxane, ethylene glycol monomethyl ether and ethylene glycol monoethyl ether, etc. Of these solvents, a hydrocarbon solvent is used preferably in combination with other solvent in view of the solvency power. The radical polymerization initiator can be any of those conventionally used. Examples of useful radical polymerization initiators are benzoyl peroxide, t-butyl peroxy-2-ethyl hexanoate and like peroxides, azobisisobutyronitrile, azobisdimethylvaleronitrile etc.

The vinyl resin (A) thus obtained has a weight average molecular weight of 3,000 to 100,000, preferably 5,000 to 30,000, a hydroxyl value of 0 to 140 mg KOH/g, preferably 60 to 120 mg KOH/g, and an acid value of 0 to 140 mg KOH/g, preferably 1 to 50 mg KOH/g.

The crosslinking agent (B) is present in the coating composition (I) of the present invention to crosslink the vinyl resin (A). Specific examples are amino resins, polyisocyanate compounds and blocked polyisocyanate compounds.

Amino resins to be used as the crosslinking agent include those extensively used for conventional thermosetting acrylic resin coating compositions such as conventional partly or completely methylolated amino resins prepared by reacting melamine, urea, benzoguanamine, acetoguanamine, spiroguanamine dicyandiamide or like amino components with aldehyde. Useful aldehydes are, for example, formaldehyde, paraformaldehyde, acetaldehyde, benzaldehyde, etc. The methylolated amino resin etherified with a suitable alcohol can also be used. Alcohols usable for etherification are, for example, methyl alcohol, ethyl alcohol, n-propyl alcohol, isopropyl alcohol, n-butyl alcohol, isobutyl alcohol, 2-ethylbutanol, 2-ethylhexanol, etc. It is preferred to use hexamethoxymethylmelamine or etherified melamine resin having methoxy groups of hexamethoxymethylmelamine partly or entirely substituted with an alkoxy group having at least 4 carbon atoms.

Examples of commercially available etherified melamine resins are butyl etherified melamine resins available under "U-VAN 20SE-60" and "U-VAN 225" (trade names, products of Mitsui Toatsu Chemicals Inc.) and under "SUPER-BECKAMINE G840" and "SUPERBECKAMINE G821" (trade names, products of Dainippon Ink & Chemicals, Inc.), methyl etherified melamine resins available under "CYMEL 303", "CYMEL 325", "CYMEL 327", "CYMEL 350" and "CYMEL 370" (trade names, products of Mitsui Cyanamide Co., Ltd.), under "NIKARAK MS17" and "NIKARAK MS15" (trade names, products of Sanwa Chemicals Co., Ltd.), under "Resimene 741" (trade name, product of Monsanto Chemical Co., Ltd.) and under "SUMIMAL M-100", "SUMIMAL M-40S" and "SUMIMAL M55" (trade names, products of Sumitomo Chemical Co., Ltd.), methylebutyl etherified melamine resins available under "CYMEL 235", "CYMEL 202", "CYMEL 238", "CYMEL 254", "CYMEL 272", and "CYMEL 1130" (trade names, products of Mitsui Cyanamide Co., Ltd.) and under "SUMIMAL M66B" (trade name, product of Sumitomo Chemical Co., Ltd.), and methyl-isobutyl etherified melamine resins available under "CYMEL XV 805" (trade name, product of Mitsui Cyanamide Co., Ltd.) and under "NIKARAK MS 95" (trade name, product of Sanwa Chemical Co., Ltd.).

The polyisocyanate compound to be used as the crosslinking agent may be one having a free isocyanate group or one having a blocked isocyanate group.

Examples of polyisocyanate compounds having a free isocyanate group are organic diisocyanates such as hexamethylene diisocyanate, trimethylhexamethylene diisocyanate and like aliphatic diisocyanates, xylene diisocyanate, isophorone diisocyanate and like cyclic aliphatic diisocyanates, tolylene diisocyanate, 4,4'-diphenylmethane diisocyanate and like aromatic diisocyanates; adducts of excess organic diisocyanate with a polyhydric alcohol, a low molecular weight polyester polyol, water or the like, copolymers of said organic diisocyanates with each other, etc. Typical examples of commercial products are "BURNOCK-D750", "BURNOCK-800", "BURNOCK DN-950", "BURNOCK-970" and "BURNOCK 15-455" (trade names, products of Dainippon Ink & Chemicals Inc.), "DESMODURE-L", "DESMODURE N", "DESMODURE HL" and "DESMODURE-N3390" (trade names, products of Bayer AG, Germany), "TAKENATE D-102", "TAKENATE D-202", "TAKENATE D-110" and "TAKENATE D-123N" (trade names, products of Takeda Chemical Ind., Ltd.), "CORONATE EH", "CORONATE L", "CORONATE HL" and "CORONATE 203" (trade names, products of Nippon Polyurethane Industry Co., Ltd.) and "DURANATE 24 A-90CX" (trade name, product of Asahi Chemical Ind., Co., Ltd.), etc.

Examples of polyisocyanate compounds having a blocked isocyanate group include said polyisocyanate compound with a blocked isocyanate group (formed by blocking a free isocyanate group with a conventional blocking agent such as oxime, phenol, alcohol, lactam, malonate or mercaptan). Typical examples of commercial products are "BURNOCK D-550" (trade name, product of Dainippon Ink & Chemicals Inc.), "TAKENATE B-815-N" (trade name, product of Takeda Chemical Ind., Ltd.), "ADITOL VXL-80" (trade name, product of Hoechst AG, Germany), and "CORONATE 2507" (trade name, product of Nippon Polyurethane Industry Co., Ltd.).

The proportion of the crosslinking agent (B) in the coating composition (I) is determined so as to provide a cured coating which exhibits the desired properties. It is favorable that the weight ratio of the vinyl resin (A)/crosslinking agent (B) be 97:3 to 50:50, preferably 90:10 to 60:40.

When the coating composition (I) according to the present invention contains a vinyl resin (C) having a HPB-triazole structure and a hydrocarbon ring in place of the vinyl resin (A) having a HPB-triazole structure, this provides an advantage of forming a coating film further improved in stain resistance and acid resistance.

Consequently, the present invention also provides a coating composition (II) comprising (C) a vinyl resin having a HPB-triazole structure and a hydrocarbon ring in the resin skeleton and (B) a crosslinking agent.

The vinyl resin (C) can be prepared by polymerizing a polymerizable vinyl monomer having a HPB-triazole structure and a polymerizable vinyl monomer having a hydrocarbon ring as the essential monomer components, and optionally at least one member selected from the group consisting of hydroxyl-containing polymerizable vinyl monomers, carboxyl-containing polymerizable vinyl monomers and other polymerizable vinyl monomers.

The polymerizable vinyl monomers exemplified above for the vinyl resin (A) can be used as the hapolymerizable vinyl monomer having a HPB-triazole structure, hydroxyl-containing polymerizable vinyl monomer, carboxyl-containing polymerizable vinyl monomer and other polymerizable vinyl monomer.

Examples of the polymerizable vinyl monomer having a hydrocarbon ring are vinyl monomers having an aromatic hydrocarbon ring, alicyclic hydrocarbon ring or like hydrocarbon ring such as styrene, α-methyl styrene, phenyl (meth) acrylate, phenylethyl (meth)acrylate, phenylpropyl (meth) acrylate, benzyl (meth)acrylate, phenoxyethyl (meth) acrylate, cyclohexyl (meth)acrylate, 2-acryloyloxyethyl hydrogenated-phthalate, 2-acryloyloxypropyl hydrogenated-phthalate, 2-acryloyloxypropyl hexahydrophthalate, 2-acryloyloxypropyl tetrahydrophthalate, ester of p-tert-butyl-benzoic acid with hydroxyethyl (meth)acrylate, dicyclopentenyl (meth) acrylate. Among them, preferred are vinyl monomers having a benzene ring such as styrene, α-methyl styrene, phenyl (meth)acrylate, phenylethyl (meth)acrylate, phenylpropyl (meth)acrylate, benzyl (meth)acrylate and the like, and vinyl monomers having an alicyclic hydrocarbon ring such as cyclohexyl (meth)acrylate.

While the proportions of these vinyl monomers in the vinyl resin (C) can be selected as desired according to the purpose, the proportion of the polymerizable vinyl monomer having a HPB-triazole structure is 0.1 to 80% by weight, preferably 0.1 to 15% by weight, the proportion of the polymerizable vinyl monomer having a hydrocarbon ring is 20 to 99.9% by weight, preferably 40 to 99.9% by weight, the proportion of the hydroxyl-containing polymerizable vinyl monomer is 0 to 80% by weight, preferably 5 to 50% by weight, the proportion of the carboxyl-containing polymerizable vinyl monomer is 0 to 10% by weight, preferably 0.1 to 5% by weight, and the proportion of the other polymerizable vinyl monomers is 0 to 99% by weight, preferably 94.8 to 35% by weight, all based on the total weight of the vinyl monomers constituting the vinyl resin (C).

The copolymerization reaction of said vinyl monomers can be performed in the same manner as done in the preparation of the vinyl resin (A).

The vinyl resin (C) thus obtained has a weight average molecular weight of 3,000 to 100,000, preferably 5,000 to 30,000, a hydroxyl value of 0 to 140 mg KOH/g, preferably 60 to 120 mg KOH/g, and an acid value of 0 to 140 mg KOH/g, preferably 1 to 50 mg KOH/g.

The crosslinking agents as exemplified above can be used in the coating composition (II). The ratio by weight of the vinyl resin (C)/crosslinking agent (B) is 97:3 to 50:50, preferably 90:10 to 60:40.

When the coating composition (I) according to the present invention contains a vinyl resin (D) having a HPB-triazole structure, a hydrocarbon ring and a 2,2,6,6-tetramethylpiperidine structure in place of the vinyl resin (A) having a HPB-triazole structure, there is obtained an advantage of forming a coating film further improved in stain resistance, acid resistance and weatherability.

Consequently, the present invention also provides a coating composition (III) comprising (D) a vinyl resin having a HPB-triazole structure, a hydrocarbon ring and a 2,2,6,6-tetramethylpiperidine structure in the resin skeleton and (B) a crosslinking agent.

The vinyl resin (D) can be prepared by polymerizing a polymerizable vinyl monomer having a HPB-triazole structure, a polymerizable vinyl monomer having a 2,2,6,6-tetramethylpiperidine structure (hereinafter referred to as "TM-piperidine structure") and a polymerizable vinyl monomer having a hydrocarbon ring as the essential components, and optionally at least one member selected from the group consisting of hydroxyl-containing polymerizable vinyl monomers, carboxyl-containing polymerizable vinyl monomers and other polymerizable vinyl monomers.

The monomers exemplified hereinbefore and those for the vinyl resin (C) can be used as the polymerizable vinyl monomer having a HPB-triazole structure, the polymerizable vinyl monomer having a hydrocarbon ring, the hydroxyl-containing polymerizable vinyl monomer, the carboxyl-containing polymerizable vinyl monomer and other polymerizable vinyl monomers.

The TM-piperidine structure in the polymerizable vinyl monomer having the TM-piperidine structure is represented by the formula (3)

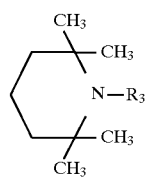

wherein $R_3$ is a hydrogen atom, an alkyl group having 1 to 18 carbon atoms, an alkoxy group having 1 to 8 carbon atoms, a cyclic alkyl group having 5 to 8 carbon atoms or an aryl group.

Examples of the alkyl group having 1 to 18 carbon atoms, alkoxy group having 1 to 8 carbon atoms, cyclic alkyl group having 5 to 8 carbon atoms and aryl group in the formula (3) are the same as exemplified above for the structure of the formula (1).

The polymerizable vinyl monomer having the TM-piperidine structure is a monomer having one polymerizable double bond per molecule and at least one TM-piperidine structure per molecule.

Specific examples of the vinyl monomer having the TM-piperidine structure are 1,2,2,6,6-pentamethyl-4-piperidyl (meth)acrylate, 2,2,6,6-tetramethyl-4-piperidyl (meth)acrylate, 1-methoxy-2,2,6,6-tetramethyl-4-piperidyl (meth)acrylate, etc.

While the proportions of these vinyl monomers in the vinyl resin (D) can be selected as desired according to the purpose, the proportion of the polymerizable vinyl monomer having a HPB-triazole structure is 0.1 to 99% by weight, preferably 0.1 to 10% by weight, the proportion of the polymerizable vinyl monomer having a TM-piperidine structure is 0.1 to 50% by weight, preferably 0.1 to 10% by weight, the proportion of the hydroxyl-containing polymerizable vinyl monomer is 0 to 80% by weight, preferably 5 to 50% by weight, the proportion of the carboxyl-containing polymerizable vinyl monomer is 0 to 10% by weight, preferably 0.1 to 5% by weight, the proportion of the other polymerizable vinyl monomer is 0 to 99% by weight, preferably 94.7 to 25% by weight, and the proportion of the polymerizable vinyl monomer having a hydrocarbon ring is 20 to 90% by weight, preferably 40 to 80% by weight, all based on the total weight of the vinyl monomers composing the vinyl resin (D).

The copolymerization reaction of said vinyl monomers can be performed in the same manner as done in the preparation of the vinyl resin (A).

The vinyl resin (D) thus obtained has a weight average molecular weight of 3,000 to 100,000, a hydroxyl value of 0 to 140 mg KOH/g, preferably 60 to 120 mg KOH/g, and an acid value of 0 to 100 mg KOH/g, preferably 1 to 50 mg KOH/g.

The crosslinking agent (B) in the coating composition (III) can be any of the examples given above. The ratio by weight of the vinyl resin (D)/crosslinking agent (B) is 97:3 to 50:50, preferably 90:10 to 60:40.

Each of the coating compositions (I), (II) and (III) according to the present invention may contain a hydroxyl-containing polyester resin (E) when so required. The incorporation of the resin (E) can further improve the flexibility of the resulting coating film.

The hydroxyl-containing polyester resin (E) prepared by reacting a polybasic acid or polybasic anhydride, polyhydric alcohol and optionally a monobasic acid can be suitably used.

Useful polybasic acids include compounds having 2 to 4 carboxyl groups per molecule, and alkyl esters thereof. Typical examples are isophthalic acid, terephthalic acid, orthophthalic acid, 2,6-naphthalenedicarboxylic acid, 4,4'-diphenylmethane-dicarboxylic acid, tetrahydrophthalic acid, methyltetrahydrophthalic acid, hexahydrophthalic acid, methylhexahydrophthalic acid, endomethylenehexahydrophthalic acid, methylendomethylenetetrahydrophthalic acid, maleic acid, fumaric acid, itaconic acid, succinic acid, glutaric acid, adipic acid, azelaic acid, pimelic acid, suberic acid, sebasic acid, aliphatic acid of dimer (dimer acid), 1,4-cyclohexanedicarboxylic acid, trimesic acid, trimellitic acid, pyromellitic acid, cyclohexanetetracarboxylic acid, alkyl esters or anhydrides of these polybasic acids and like reactive derivatives.

Examples of polyhydric alcohols are aliphatic polyhydric alcohols having 2 to 6 hydroxyl groups in one molecule. Typical examples are ethylene glycol, propylene glycol, trimethylene glycol, 1,4-butanediol, 1,3-butanediol, 1,5-pentanediol, 1,6-hexanediol, neopentyl glycol, 2-butyl-2-ethylpropanediol, glycerin, trimethylolethane, trimethylolpropane, pentaerythritol, dipentaerythritol and sorbitol, polyester polyol compounds prepared by subjecting these polyhydric alcohols and ε-caprolactone to addition reaction, etc. Usable, if necessary, in combination with the above aliphatic polyhydric alcohols are alicyclic polyhydric alcohols such as 1,4-cyclohexanedimethanol, tricyclodecanedimethanol, hydrogenated bisphenol, alkylene oxide adducts of hydrogenated bisphenol and the like, aromatic polyhydric alcohols such as bishydroxyethyl terephthalate, bisphenol, alkylene oxide adducts of bisphenol and the like, and monoepoxide compounds such as methylene oxide, ethylene oxide and the like.

Monobasic acid to be optionally used are, for example, benzoic acid, p-tert-butyl benzoate, methyl benzoate, etc.

The hydroxyl-containing polyester resin can be prepared by conventional processes for preparing a polyester resin or an alkyd resin, for example, by reacting a mixture of the foregoing components in the atmosphere of inert gas at about 160 to about 250° C. for about 3 to about 10 hours while removing the condensate produced as a by-product from the reaction system. In the reaction, an esterification catalyst, an organic solvent and the like can be used when so required.

The hydroxyl-containing polyester resin (E) thus obtained has a weight average molecular weight of 1,000 to 100,000, preferably 3,000 to 50,000, a hydroxyl value of 10 to 200 mg KOH/g, preferably 25 to 150 mg KOH/g, and a glass transition temperature of not higher than 10° C., preferably −10 to −100° C.

The hydroxyl-containing polyester resin (E) is used in a ratio by weight of the vinyl resin (A), (C) or (D)/the polyester resin (E) in the range of 100/0–5/95, preferably 90/10–50/50.

The coating compositions (I), (II) and (III) of the invention are usually used as an organic solvent composition.

Useful organic solvents are, for example, hydrocarbon solvents such as heptane, toluene, xylene, octane and mineral spirit, ester solvents such as ethyl acetate, n-butyl acetate, isobutyl acetate, methyl cellosolve acetate and butyl carbitol acetate, ketone solvents such as methyl ethyl ketone, methyl isobutyl ketone and diisobutyl ketone, alcohol solvents such as methanol, ethanol, isopropanol, n-butanol, sec-butanol and isobutanol, ether solvents such as n-butyl ether, dioxane, ethylene glycol monomethyl ether and ethylene glycol monoethyl ether, and aromatic petroleum solvents such as "SWASOL 310", "SWASOL 1000" and "SWASOL 1500" (trade names, products of Cosmo Oil Co., Ltd.). These organic solvents can be used either alone or in combination. While organic solvents having a boiling point of not higher than about 150° C. are preferred in view of curability, useful solvents are not limited to them at all.

Each of the coating compositions (I), (II) and (III) according to the present invention may contain additives such as fine particles of polymers 0.01 to 1 μm in average diameter, cellulose acetate butyrate, epoxy resins, pigments, curing catalysts, UV absorbers, UV stabilizers, coating surface modifiers, antioxidants, fluidity controllers, pigment dispersants, silane coupling agents, etc.

Pigments to be incorporated into the coating compositions (I), (II) and (III) of the invention are, for example, organic pigments such as quinacridone and like quinacridone pigments, pigment red and like azo pigments, phthalocyanine blue, phthalocyanine green and like phthalocyanine pigments, inorganic pigments such as titanium oxide, barium sulfate, calcium carbonate, clay and silica, carbon type pigments such as carbon black, metal powders such as powders of aluminum, micaceous iron oxide and stainless steel, and anti-corrosive pigments such as red iron oxide and strontium chromate.

When the crosslinking agent (B) is an amino resin, preferred curing catalysts are conventional acid catalysts such as paratoluenesulfonic acid, dodecylbenzenesulfonic acid and the like. Further, when such acid catalyst is used, the catalyst may be neutralized with an amine compound such as triethylamine, diethanolamine, 2-amino-2-methylpropanol or the like to impart storage stability to the composition as a one-pack composition.

When the crosslinking agent (B) is a polyisocyanate compound or blocked polyisocyanate compound, a curing catalyst such as dibutyltin diacetate, dibutyltin dioctate, dibutyltin dilaurate, triethylamine, diethanolamine and the like can be used.

The coating compositions (I), (II) and (III) of the present invention can be applied to substrates by coating means such as electrostatic coating (e.g., bell type), spray coating, etc. It is suitable that the thickness of the coating film be about 10 to about 60 μm when dried. The deposited composition is dried at a temperature of about 60 to about 140° C. for about 10 to about 60 minutes although the drying conditions depend on the kind of the crosslinking agent used.

The coating compositions (I), (II) and (III) of the present invention assure high storage stability and the coating film of the composition has a good appearance and excellent processability and is improved in weatherability, acid resistance, stain resistance and scratch resistance. Therefore, the coating compositions of the invention are particularly suitable as a top coat composition over a plastics substrate.

Now described below is the coating method of the invention which comprises applying the coating composition (I), (II) or (III) of the invention to plastics substrates.

The coating method of the invention comprises applying the coating composition of the invention directly to a plastics substrate or to a plastics substrate coated with a primer or with a primer and an intercoat composition and causing the coating to cure.

There is no specific limitation on the plastics substrates to be coated. Usable as plastics for substrates are polypropylene, ethylene-propylene copolymer, EPDM, polyamide, polyester, polyphenylene oxide, acrylonitrile-styrene-butadiene copolymer, polycarbonate, ethylene-vinyl acetate copolymer, unsaturated polyester, polyurethane, reinforced polyurethane and the like. These plastics can be used as they are or as washed with or chemically treated with alkali, acid, organic solvent or the like. They can also be used after corona discharge treatment.

Useful primers include conventional primers for plastics substrates such as polyurethane primers, olefin primers and modified olefin primers. It is suitable that the thickness of the primer film be about 5 to about 50 μm when dried.

Intercoat compositions to be used may be those conventionally used which are superior in adhesion, surface smoothness, distinctness-of-image gloss, weatherability, etc. For example, preferred intercoat compositions are curable compositions comprising a short-oil or supershort-oil alkyd resin (up to 30% in oil length) or an oil-free polyester resin, and an amino resin or a free or blocked polyisocyanate as main components. It is suitable that the thickness of the intercoat be about 10 to about 50 μm when dried.

The coating composition (I), (II) or (III) of the invention is applied to the surface of a plastics substrate or a plastics substrate coated with a primer and the like. In the formation of a top coat, a conventional coating method is carried out according to a coating system including, for example, 1-coat 1-bake system, 2-coat 1-bake system (base coat/clear coat), 2-coat 2-bake system (base coat/clear coat), 3-coat 1-bake system (base coat/clear coat/clear coat), 3-coat 2-bake system (base coat/clear coat/clear coat), etc. According to the coating method of the invention, the coating composition (I), (II) or (III) is preferably applied for forming the uppermost layer, for example, for forming a clear coat by 2-coat 1-bake system or a solid color coat by 1-coat 1-bake system.

When the coating composition of the invention is applied to form a clear top coat according to 2-coat 1-bake system or 2-coat 2-bake system, a UV absorber or UV stabilizer is not necessarily incorporated into the composition because a HPB-triazole structure as a UV absorbing structure or a TM-piperidine structure as a UV stabilizing structure is chemically bonded to the vinyl resin as the base resin. However, if necessary, the UV absorber or UV stabilizer may be added.

Specific examples of useful ultraviolet absorbers are benzophenone compounds such as benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4-methoxybenzophenone, 2-hydroxy-4-octoxybenzophenone, 2-hydroxy-4-dodecyloxybenzophenone, 2-hydroxy-4-methoxy-5-sulfobenzophenone, 5-chloro-2-hydroxybenzophenone, 2,2'-dihydroxy-4,4'-dimethoxy-5-sulfobenzophenone, 2-hydroxy-4-methoxy-2'-carboxybenzophenone and 2-hydroxy-4-(2-hydroxy-3-methylacryloxy)propoxybenzophenone; benzotriazole compounds such as 2-(2'-hydroxy-5'-methyl-phenyl) benzotriazole, 2-(2'-hydroxy-3',5'-di-tert-butyl-phenyl) benzotriazole, 2-(2'-hydroxy-3'-tert-butyl-5'-methyl-phenyl) benzotriazole, 2-(2'-hydroxy-3',5'-di-tert-butyl-phenyl)-5-chlorobenzotriazole, 2-(2'-hydroxy-3',5'5-di-tert-isoamyl)-phenyl)benzotriazole and 2-(hydroxy-5-tert-butyl-phenyl) benzotriazole; acrylate compounds such as ethyl-2-cyano-3,3'-diphenyl acrylate and 2-ethylhexyl-2-cyano-3,3'-diphenyl acrylate; salicylate compounds such as phenylsalicylate, 4-tert-butyl-phenylsalicylate and para-octyl-phenylsalicylate; anilide oxalate compounds such as ethanediamide-N-(2-ethoxyphenyl)-N'-(4-isododecylphenyl), 2-ethyl-2'-ethoxyoxalanilide and 2-ethoxy-5-tert-butyl-2'-ethyl-oxalanilide; and other compounds including hydroxy-5-methoxy-acetophenone, 2-hydroxy-naphthophenone, 2-ethoxyethyl-para-methoxycinnamate, nickel-bisoctylphenylsulfide and [2,2'-thiobis(4-tert-octylphenolate)]-n-butylamine-nickel.

Useful ultraviolet stabilizers include, for example, bis(1, 2,2,6,6-pentamethyl-4-piperidinyl)-2-butyl-2-(4-hydroxy-3, 5-di-tert-butylbenzyl)propanedioate, bis(1,2,2,6,6-pentamethyl-4-piperidyl)sebacate, 8-acetyl-3-dodecyl-7,7, 9,9-tetramethyl-1,3,8-triazaspiro-[4,5]deczane-2,4-dione, commercially available products such as "TINUVIN 144", "TINUVIN 292" and "TINUVIN 440" (trade names, products of Ciba-Geigy), "SANOL LS-770" (trade name, product of Sankyo Co., Ltd.) and like hindered amine compounds.

The foregoing clear coating composition is usually used without incorporation of a coloring pigment but may contain a coloring pigment to an extent which does not hide the colored base coat.

In the practice of the invention, a 2-coat 1-bake system can be carried out, for example, by applying a colored base coat composition to the plastics substrate, coating the base coat with said clear top coat composition and baking the coats. The colored base coat composition and the clear top coat composition can be applied by conventional coating methods, e.g. electrostatic coating, non-electrostatic coating or the like. A preferred dry thickness of the colored base coat is about 10 to about 50 µm. The base coat composition thus deposited is left to stand at room temperature for a few minutes or is forcedly dried at 50 to 80° C. for a few minutes, followed by application of the clear top coat composition. A preferred dry thickness of the clear top coat is about 10 to about 60 µm. Subsequently the colored base coat and the clear top coat are usually heated to a temperature of about 60 to about 140° C. for about 20 to about 40 minutes to cure the two coats at the same time.

Preferred colored base coat compositions include curable coating compositions containing a metal flake powder and/or mica powder. Such colored base coat composition is known. Stated more specifically, typical base coating compositions are of organic solvent type, aqueous type or like curable type each comprising a base resin such as an acrylic resin, polyester resin or acryl-modified polyester resin, a crosslinking agent such as an amino resin, an isocyanate or a blocked polyisocyanate, and when required, cellulose acetate butyrate, a coloring pigment, an extender pigment, organic polymer particles, an anti-settling agent, a sag inhibitor, a pigment dispersant, a UV absorber, and other additives for coating compositions. Organic solvent coating compositions include those having a usual solid content, high solid compositions and nonaqueous compositions. Useful metal flake powders include, for example, flake powders of aluminum, nickel, copper, stainless steel, brass, chrome or the like. Useful mica powders include, for example, powders of pearl mica, colored pearl mica or the like.

The coating compositions of the present invention have various advantages, for example, they show high storage stability and are capable of forming a coating film which is outstanding in finished appearance in terms of surface smoothness, gloss, distinctness-of-image gloss, etc. and which is superior in processability such as flexibility and in weatherability, stain resistance, scratch resistance, acid resistance, etc.

Given below are Preparation Examples, Examples and Comparative Examples to illustrate the present invention in more detail. The parts and percentages in the examples are all by weight unless otherwise specified.

PREPARATION EXAMPLE 1

Preparation of a solution of vinyl resin (A)

A conventional reaction vessel for acrylic resins equipped with a stirrer, thermometer, reflux condenser and the like was charged with 55 parts of SWASOL 1000 (product of Cosmo Oil Co., Ltd., aromatic solvent) and 5 parts of n-butanol. The mixture was heated with stirring to 130° C. Then the following monomer mixture was added dropwise over a period of 4 hours.

| | |
|---|---|
| 2-(2'-Hydroxy-5'-methacryloxyethylphenyl)-2H-benzotriazole | 10 parts |
| Methyl methacrylate | 60 parts |
| Lauryl methacrylate | 7 parts |
| 2-Hydroxyethyl acrylate | 20 parts |
| Acrylic acid | 3 parts |
| α,α'-Azobisisobutyronitrile | 6 parts |

After addition of the foregoing monomer mixture, the contents of the vessel were maintained at 130° C. for 30 minutes. Then a mixture of 0.5 part of azobisdimethyl valeronitrile and 20 parts of SWASOL 1000 was added dropwise over 1 hour. The contents were stirred while maintaining them at 125° C. for 1 hour. After cooling, 35 parts of SWASOL 1000 and 5 parts of n-butanol were added to dilute the mixture, giving a solution of vinyl resin (A-1) having a solid concentration of 50%. The vinyl resin of the solution (A-1) had a weight average molecular weight (MW) of 11,000 and a hydroxyl value of 97 mg KOH/g and an acid value of 27 mg KOH/g.

PREPARATION EXAMPLES 2 to 7

Preparation of solutions of vinyl resins (C) and (D)

Vinyl resin solutions (C-1), (D-1), (D-2) and (D-3) were prepared in the same manner as in Preparation Example 1. The solutions had a solid concentration of 50%. The composition of monomers constituting the vinyl resins, weight average molecular weight, hydroxyl value and acid value are shown in Table 1. The hydrocarbon ring content in the resin corresponds with the percentage of styrene content based on the total amount of the monomer components. In Table 1, Preparation Examples 6 and 7 are for vinyl resin solutions (F-1) and (F-2) for comparative purpose.

TABLE 1

| Preparation Example No. | 1 | 2 | 3 | 4 | 5 | 6 | 7 |
|---|---|---|---|---|---|---|---|
| Vinyl resin solution | (A-1) | (C-1) | (D-1) | (D-2) | (D-3) | (F-1) | (F-2) |
| Methyl methacrylate | 60 | | | | | 70 | |
| Styrene | | 63 | 62 | 45 | 57 | | 62 |
| Lauryl methacrylate | 7 | 8 | 6 | 9 | 6 | 7 | 14 |
| n-Butyl methacrylate | | | | 17 | 11 | | |
| 2-Hydroxyethyl acrylate | 20 | 17 | 17 | 17 | 17 | 20 | 17 |
| Acrylic acid | 3 | 3 | 3 | 3 | 3 | 3 | 3 |
| 2-(2'-Hydroxy-5'-methacryloxyethyl | | | | | | | |

TABLE 1-continued

| Preparation Example No. | 1 | 2 | 3 | 4 | 5 | 6 | 7 |
|---|---|---|---|---|---|---|---|
| phenyl)-2H-benzotriazole | 10 | 9 | 8 | 5 | 2 | | |
| 1,2,2,6,6-Tetramethyl-4-piperidyl methacrylate | | | 4 | 4 | 4 | | 4 |
| weight average moleaular weight (MW) | 11,000 | 11,000 | 11,000 | 10,000 | 11,000 | 11,000 | 11,000 |
| Hydroxyl value (mg KOH/g) | 97 | 82 | 82 | 82 | 82 | 97 | 82 |
| Acid value (mg KOH/g) | 27 | 27 | 27 | 27 | 27 | 27 | 27 |

PREPARATION EXAMPLE 8

Preparation of hydroxyl-containing polyester resin solution (E-1)

Using a conventional apparatus for preparing a polyester resin which is equipped with a heater, stirrer, reflux device, water separator, fractionating column and thermometer, the reaction vessel was charged with 45.51 parts (0.9 mole) of 1,6-hexanediol, 5.85 parts (0.1 mole) of trimethylolpropane, 31.28 parts (0.50 mole) of adipic acid and 32.00 parts (0.45 mole) of isophthalic acid and was heated. After the materials were dissolved, stirring was initiated when stirring became feasible. The reaction vessel was heated to 230° C. The temperature was elevated at an equal rate from 160 to 230° C. over 3 hours. The condensed water produced was discharged to outside through a fractionating column. On reaching 230° C., the temperature was held constant with stirring for 2 hours. Subsequently xylol was placed into the reaction vessel to carry out a solvent condensation method and the reaction was continued. When the acid value reached 8 mg KOH/g, the reaction was terminated and the reaction mixture was cooled. When the temperature was lowered to some extent, 66.7 parts of xylol was added to dilute the mixture, giving a solution of hydroxyl-containing polyester resin having a solid concentration of 60% (E-1). The polyester resin had a weight average molecular weight (MW) of 12,000, a hydroxyl value of 48 mg KOH/g and a glass transition temperature of −59° C. as determined by a differential thermal analysis method.

TABLE 2

| Preparation Example No. | 8 | 9 |
|---|---|---|
| Polyester resin solution | (E-1) | (E-2) |
| 1,6-Hexanediol | 0.90 | 0.90 |
| Trimethylolpropane | 0.10 | 0.10 |
| Adipic acid | 0.50 | 0.70 |
| Isophthalic acid | 0.45 | 0.25 |
| Weight average molecular weight (MW) | 12,000 | 12,000 |
| Hydroxyl value (mg KOH/g) | 48 | 49 |
| Acid value (mg KOH/g) | 8 | 8 |
| Glass transition temperature (°C.) | −59 | −72 |

EXAMPLES 1 to 5 AND COMPARATIVE EXAMPLES 1 to 3

Clear coat compositions were prepared from the components shown in Table 3.

The storage stability of the clear coat compositions was determined by a method described below, and the results are shown in Table 3. Storage stability The coating composition was stored in a closed container at 60° C. for 24 hours and the viscosity (Ford cup #4/25° C.) was rated according to the following criteria.

A: Substantially no change (less than one second), B: Slightly thickened (1.0 to 5.0 seconds), C: Thickening clearly recognized (5.0 to 10.0 seconds), D: Pronouncedly thickened (at least 10 seconds)

TABLE 3

| Component | | Example | | | | | Comparative Example | | |
|---|---|---|---|---|---|---|---|---|---|
| | | 1 | 2 | 3 | 4 | 5 | 1 | 2 | 3 |
| Vinyl resin | Kind | A-1 | C-1 | D-1 | D-2 | D-3 | F-1 | F-1 | F-2 |
| | Amount | 50 | 50 | 50 | 50 | 50 | 50 | 50 | 50 |
| Polyester resin | Kind | E-2 | E-2 | E-2 | E-2 | E-1 | E-2 | E-2 | E-2 |
| | Amount | 20 | 20 | 20 | 20 | 20 | 20 | 20 | 20 |
| Amino resin | | 30 | 30 | 30 | 30 | 30 | 30 | 30 | 30 |
| Curing catalyst | | 1.0 | 1.0 | 1.0 | 1.0 | 1.0 | 1.0 | 1.0 | 1.0 |
| Surface modifier | | 0.1 | 0.1 | 0.1 | 0.1 | 0.1 | 0.1 | 0.1 | 0.1 |
| UV absorber | | 0 | 0 | 0 | 0 | 0 | 0 | 5.0 | 0 |
| UV stabilizer | | 0 | 0 | 0 | 0 | 0 | 0 | 2.0 | 0 |
| Storage stability | | C | C | A | A | A | D | D | D |

PREPARATION EXAMPLE 9

Preparation of hydroxyl-containing polyester resin solution (E-2)

A hydroxyl-containing polyester resin solution (E-2) was prepared by the same method as in Preparation Example 8. The solid concentration was 60%. The composition (molar ratio) of the polyester resin (E-2) and the property values of the resin are shown below in Table 2.

The contents or amounts of the components used in Examples and Comparative Examples in Table 3 are those calculated as the solid contents or as the amounts of active component.

The amino resin, curing catalyst, surface modifier, UV absorber and UV stabilizer shown in Table 3 are as follows.

Amino resin: "U-VAN 20 SE", trade name, product of Mitsui Cyanamide Co., Ltd., resin solid content about 60%, n-butyl etherified melamine resin Curing catalyst: "NACURE 5543" (trade name, product of King Industry Corp. U.S.A. containing about 25% dodecylbenzenesulfonic acid neutralized with amine as an active component)

Surface modifier: "BYK-300" (solution), trade name, product of BYK CHEMIE Co., Ltd.

UV absorber: "TINUVIN 900", product of Ciba-Geigy, benzotriazole-type UV absorber UV stabilizer: "TINUVIN 292", trade name, product of Ciba-Geigy, piperidine-type UV stabilizer A solvent mixture (xylol/n-butanol=9/1) was incorporated into the coating compositions in Examples and in Comparative Examples to adjust the viscosity to 25 seconds (Ford cup #4/25° C.). The obtained coating compositions were applied to a substrate (namely a test piece prepared below).

An R-RIM (reinforced-reaction injection molding) urethane plastics substrate degreased with trichloroethane under steam was sprayed with a urethane elastomer resin gray-colored primer (product of Kansai Paint Co., Ltd., "SOFLEX No. 1000", trade name) to a dry thickness of 15 to 20 μm. The coated substrate was baked at 80° C. for 30 minutes to give a plastics test piece.

Film-forming conditions I

The foregoing plastics test piece was sprayed with a metallic base coat composition (a) ("SOFLEX No.1400", trade name, product of Kansai Paint Co., Ltd., melamine-curing coating composition) using "Air Spray Gun. F5" (trade name, product of Meiji Machinery Mfg. Co., Ltd.) to a dry thickness of about 15 μm. After standing at room temperature for about 3 minutes, the coated substrate was coated with each of the clear coating compositions of Examples and Comparative Examples using "Air Spray Gun F5" to give a coating film about 40 μm in dry thickness. Thereafter the coated substrate was allowed to stand for setting at room temperature for about 10 minutes. Subsequently the coated substrate was heated to 120° C. for 30 minutes with a hot air electric dryer to cure the base coat and the clear coat at the same time.

Film-forming conditions II

A coating film was formed as described below to determine the gel fraction.

A tin plate was sprayed with each of the coating compositions of Examples and Comparative Examples to a dry thickness of 40 μm. The coated tin plate was heated for curing at 120° C. for 30 minutes and the cured coating film was removed from the tin plate using mercury.

The obtained test pieces were tested by the following methods.

Test methods

Appearance of coating film

The finished appearance of the coating film was visually evaluated in terms of luster and apparent fatness on the following A–C scale.

A: Excellent, B: Good, C: Poor 20° gloss

The specular reflectivity was determined at an angle of 20°.

Low temperature flexibility

The coated test piece was left to stand in the atmosphere of −20° C. for 4 hours and bent at an angle of 180° around an iron rod 20 mm in diameter. The coated portion of the test piece was visually assessed and rated on the following A–D scale.

A: free of a flaw such as cracking, B: cracking or like flaws slightly exist, C: cracking or like flaws thinly exist, D: cracking or like flaws thickly exist.

Weatherability

The coated test piece was exposed to sunshine weather-O-meter for 1,600 hours and visually evaluated on the following A–C scale.

A: no change, B: small cracks occurred, C: cracks occurred.

Pencil hardness

Pencil scratching value according to JIS K 5400 was indicated.

Acid resistance

Artificial rain (0.4 ml) was let fall onto the coated test piece, which was then heated to 85° C. for 15 minutes on a hot plate and washed with water. The coating surface was visually inspected and rated according to the following criteria.

A: no change, B: no change on the coating surface, but a slight difference in level between the water-dropped area and non-dropped area, C: blushed on coating surface.

The artificial rain used was a mixture of 19.6 g of a 1 mg/g solution of $NaNO_3$, 5.2 g of a 1 mg/g solution of $KNO_3$, 3.7 g of a 1 mg/g solution of $CaCl_2.2H_2O$, 8.2 g of a 1 mg/g solution of $MgSO_4.7H_2O$, 73.3 g of a 1 mg/g solution of $(NH_4)_2SO_4$, 30.0 g of a 0.1N solution of $H_2SO_4$, 20.0 g of a 0.1N solution of $HNO_3$, 10.0 g of a 0.05N solution of HCl, and 4.7 g of a 1 mg/g solution of NaF, the mixture having been adjusted to pH 1 with $H_2SO_4$.

Water resistance

The coated test piece was immersed in warm water at 40° C. for 240 hours and washed with water. Then the coating surface was visually inspected for evaluation on the following scale.

A: no change, B: slight dulling

Solvent resistance

The coating surface was wiped with a gauze soaked with xylol by 10 reciprocatory strokes, and visually inspected for evaluation on an A to C scale.

A: no change, B: various mars on coating surface, C: swollen portions on coating surface with a tendency to blush.

Scratch resistance

An automobile with a coated test piece attached to the top of its roof was washed 5 times with a car washer (product of Yasui Sangyo Co., Ltd., "PO 20FWRC", trade name) and then the coating surface of the test piece was visually inspected for evaluation on the following scale.

A: substantially no scratch visually observed, excellent, B: slight scratch but to a negligible extent, good, C: marked scratches visually observed, poor, D: various scratches clearly recognized, poorest.

Gel fraction ratio

The coating film removed from the tin plate was placed into a container of stainless steel having a 300-mesh network structure and was subjected to extraction with a 1:1 solvent mixture of acetone/methanol for 6 hours. The gel fraction ratio was determined according to the following equation.

Gel fraction ratio (%)=(weight of film after extraction/weight of film before extraction)×100

The results of evaluation are set forth below in Table 4.

TABLE 4

| Item of Test | Example | | | | | Comparative Example | | |
|---|---|---|---|---|---|---|---|---|
| | 1 | 2 | 3 | 4 | 5 | 1 | 2 | 3 |
| Film appearance | A | A | A | A | A | A | A | A |
| 20° gloss | 98 | 98 | 98 | 95 | 96 | 98 | 98 | 98 |
| Low temp. flexibility | A | A | A | A | A | B | B | A |
| Weatherability | B | B | A | A | A | C | B | C |
| Pencil hardness | B | B | B | 2B | B | B | B | B |
| Acid resistance | B | A | A | A | A | B | B | A |
| Water resistance | B | A | A | A | A | B | B | A |
| Solvent resistance | A | A | A | A | A | A | A | A |
| Scratch resistance | A | A | A | A | A | A | A | A |
| Gel fraction ratio | 94 | 94 | 94 | 96 | 95 | 93 | 89 | 94 |

We claim:

1. A coating composition comprising:
   (A) a vinyl resin having a structure of 2-(2'-hydroxyphenyl)-benzotriazole in the resin skeleton,
   (E) a hydroxyl-containing polyester resin having a weight average molecular weight of 1,000 to 100,000, a hydroxyl value of 10 to 200 mg KOH/g, and a glass transition temperature of not higher than 10° C., and
   (B) a crosslinking agent.

2. The coating composition according to claim 1, wherein the crosslinking agent (B) is an amino resin, a polyisocyanate compound or a blocked polyisocyanate compound.

3. A coating composition comprising:
   (C) a vinyl resin having a structure of 2-(2'-hydroxphenyl)-benzotriazole and a hydrocarbon ring in the resin skeleton,
   (E) a hydroxyl-containing polyester resin having a weight average molecular weight of 1,000 to 100,000, a hydroxyl value of 10 to 200 mg KOH/g, and a glass transition temperature of not higher than 10° C., and
   (B) a crosslinking agent.

4. The coating composition according to claim 3, wherein the crosslinking agent (B) is an amino resin, a polyisocyanate compound or a blocked polyisocyanate compound.

5. A coating composition comprising:
   (D) a vinyl resin having a structure of 2-(2'-hydroxyphenyl)-benzotriazole, a hydrocarbon ring and a structure of 2,2,6,6-tetramethylpiperidine in the resin skeleton, and
   (B) a crosslinking agent.

6. The coating composition according to claim 5 which further contains:
   (E) a hydroxyl-containing polyester resin having a weight average molecular weight of 1,000 to 100,000, a hydroxyl value of 10 to 200 mg KOH/g, and a glass transition temperature of not higher than 10° C.

7. The coating composition according to claim 5, wherein the crosslinking agent (B) is an amino resin, a polyisocyanate compound or a blocked polyisocyanate compound.

8. A method of forming a coating film, comprising applying the coating composition of claim 1, 3 or 5 to a plastics substrate.

9. A coated product obtained by the coating method of claim 8.

* * * * *

UNITED STATES PATENT AND TRADEMARK OFFICE
CERTIFICATE OF CORRECTION

PATENT NO. : 5,891,961
DATED : April 6, 1999
INVENTOR(S) : KAWAMURA et al.

It is certified that error appears in the above-identified patent and that said Letters Patent is hereby corrected as shown below:

On the title page of the patent item [73], the assignee, "Kansai Paint Co., Ltd.," should be --Kansai Paint Company Limited-- therefor.

Signed and Sealed this

Twenty-fifth Day of April, 2000

Attest:

Q. TODD DICKINSON

Attesting Officer

Director of Patents and Trademarks